United States Patent
Satake et al.

(10) Patent No.: US 7,614,468 B2
(45) Date of Patent: Nov. 10, 2009

(54) STRADDLE-TYPE VEHICLE (75) Inventors: Hidenori Satake, Shizuoka (JP); Satoshi Suzuki, Shizuoka (JP)

(73) Assignee: Yamaha Hatsudoki Kabushiki Kaisha, Shizuoka-Ken (JP)

( * ) Notice: Subject to any disclaimer, the term of this patent is extended or adjusted under 35 U.S.C. 154(b) by 395 days.

(21) Appl. No.: 11/557,936

(22) Filed: Nov. 8, 2006

(65) Prior Publication Data

US 2007/0102216 A1 May 10, 2007

(30) Foreign Application Priority Data

Nov. 8, 2005 (JP) ............................. 2005-323447

(51) Int. Cl.
*B60K 13/02* (2006.01)

(52) U.S. Cl. ...................... 180/68.3; 180/219

(58) Field of Classification Search ................. 180/219, 180/68.3, 218

See application file for complete search history.

(56) References Cited

U.S. PATENT DOCUMENTS

| 4,796,719 | A | 1/1989 | Shiratsuchi | |
|---|---|---|---|---|
| 6,234,531 | B1* | 5/2001 | Kurayoshi et al. | 280/835 |
| 2003/0075659 | A1* | 4/2003 | Fukunaga et al. | 248/309.1 |
| 2005/0173918 | A1* | 8/2005 | Eguchi et al. | 280/834 |
| 2006/0065459 | A1* | 3/2006 | Nakazawa et al. | 180/219 |
| 2007/0023218 | A1* | 2/2007 | Koike et al. | 180/219 |
| 2007/0102216 | A1* | 5/2007 | Satake et al. | 180/219 |
| 2007/0106438 | A1* | 5/2007 | Sasaki | 701/29 |
| 2008/0283321 | A1* | 11/2008 | Hirano et al. | 180/219 |

FOREIGN PATENT DOCUMENTS

| DE | 19938273 A1 | 3/2000 |
|---|---|---|
| EP | 1602569 A1 | 12/2005 |
| FR | 2603004 A1 | 2/1998 |
| JP | 2000282993 A | 3/1999 |
| JP | 2002-293281 | 10/2002 |

OTHER PUBLICATIONS

Search Report for corresponding European Application No. 06023267.5 lists the reference above.

* cited by examiner

*Primary Examiner*—Lesley D Morris
*Assistant Examiner*—Tashiana Adams
(74) *Attorney, Agent, or Firm*—Hogan & Hartson LLP

(57) ABSTRACT

A straddle-type vehicle with reduced ineffective fuel residue, simplified fuel supply system construction and increased air cleaner volume. A seat is arranged rearwardly of a fuel tank and an air cleaner is mounted below a rear portion of the fuel tank. A bottom plate of the fuel tank is formed with a mount seat to which a fuel pump is mounted. A seat is arranged rearwardly of the fuel tank and an air cleaner is arranged below a rear portion of the fuel tank. The mount seat is provided on a central bottom surface of the bottom plate of the fuel tank, which is lower than a rear bottom surface positioned above the air cleaner.

11 Claims, 12 Drawing Sheets

STRADDLE-TYPE VEHICLE

RELATED APPLICATIONS

This application claims the benefit of priority under 35 USC 119 of Japanese patent application no. 2005-323447, filed on Nov. 8, 2005, which application is hereby incorporated by reference in its entirety.

BACKGROUND OF THE INVENTION

1. Field of the Invention

The present invention relates to a straddle-type vehicle.

2. Description of Related Art

A straddle-type vehicle, such as a motorcycle, may be constructed such that a seat is disposed behind a fuel tank and an air cleaner is mounted below a rear portion of the fuel tank. A straddle-type vehicle of this kind, however, imposes significant restrictions on the position in which the fuel tank may be mounted while avoiding interference of a fuel pipe that extends downward from the fuel tank with the air cleaner.

On the other hand, fuel that cannot be drawn by a fuel pump out of the fuel tank (referred below to as ineffective residue) is generated according to the shape of the fuel tank and the position of the fuel pump. In order to reduce the ineffective residue, the fuel pump must be disposed in a position in which a major part of the fuel in the tank can be drawn. Thus, from the viewpoint of restricting ineffective residue, there are certain restrictions on the shape of the fuel tank and layout of the fuel pump.

In order to increase freedom in the mount position of the fuel pump and to reduce the ineffective residue, JP-A-2002-293281 proposes an external pipe line composed of a rubber hose, through which fuel is supplied to the fuel pump from a low location in the fuel tank, so that a major part of the fuel is drawn even when the fuel pump is not provided in a lower location in the fuel tank.

However, the motorcycle of JP-A-2002-293281 is complicated in construction since there is a need for an external pipe line below the fuel tank. Also, since the external pipe line is present below the fuel tank, the space available for the air cleaner to be mounted is decreased correspondingly, making it difficult to enlarge the volume of the air cleaner.

SUMMARY OF THE INVENTION

The invention overcomes these disadvantages and provides, in a straddle-type vehicle having a seat behind a fuel tank and an air cleaner mounted below a rear portion of the fuel tank, reduced ineffective fuel residue, simplified fuel supply system construction, and increased air cleaner volume.

The invention provides a straddle-type vehicle comprising a fuel tank including a bottom plate formed with a mount seat, a seat arranged rearwardly of the fuel tank, an air cleaner arranged below a rear portion of the fuel tank, and a fuel pump mounted to the mount seat and having at least a part thereof accommodated in the fuel tank. The mount seat is provided on a portion of the bottom plate of the fuel tank that is lower than a portion positioned above the air cleaner.

In a straddle-type vehicle according to the invention, the mount seat, to which a fuel tank is mounted, is provided on a portion of the bottom plate of the fuel tank that is lower than a portion positioned above the air cleaner, so that fuel accumulated in an upper portion of the air cleaner in the fuel tank naturally flows down toward the mount seat. The shape of the bottom plate is not limited to that of a flat plate but may comprise, for example, an irregular portion and a curved portion. Therefore, fuel is not accumulated and ineffective fuel residue is reduced. Since there is no need of any external pipe line below the fuel tank, fuel supply system construction is simplified. Even when the fuel pump is not arranged above the air cleaner, ineffective fuel residue is reduced, so that interference of the fuel tank (and its piping or the like) with the air cleaner is avoided by arranging the fuel pump in a position except above the air cleaner. Accordingly, increase air cleaner volume is provided without restrictions by the fuel pump or the like.

According to the straddle-type vehicle of the invention, ineffective fuel residue is reduced, fuel supply system construction is simplified, and air cleaner volume is increased.

Other features and advantages of the invention will be apparent from the following detailed description, taken in conjunction with the accompanying drawings which illustrate, by way of example, various features of embodiments of the invention.

DETAILED DESCRIPTION OF THE INVENTION

An embodiment of the invention is described below in detail with reference to the drawings.

Figure 1:
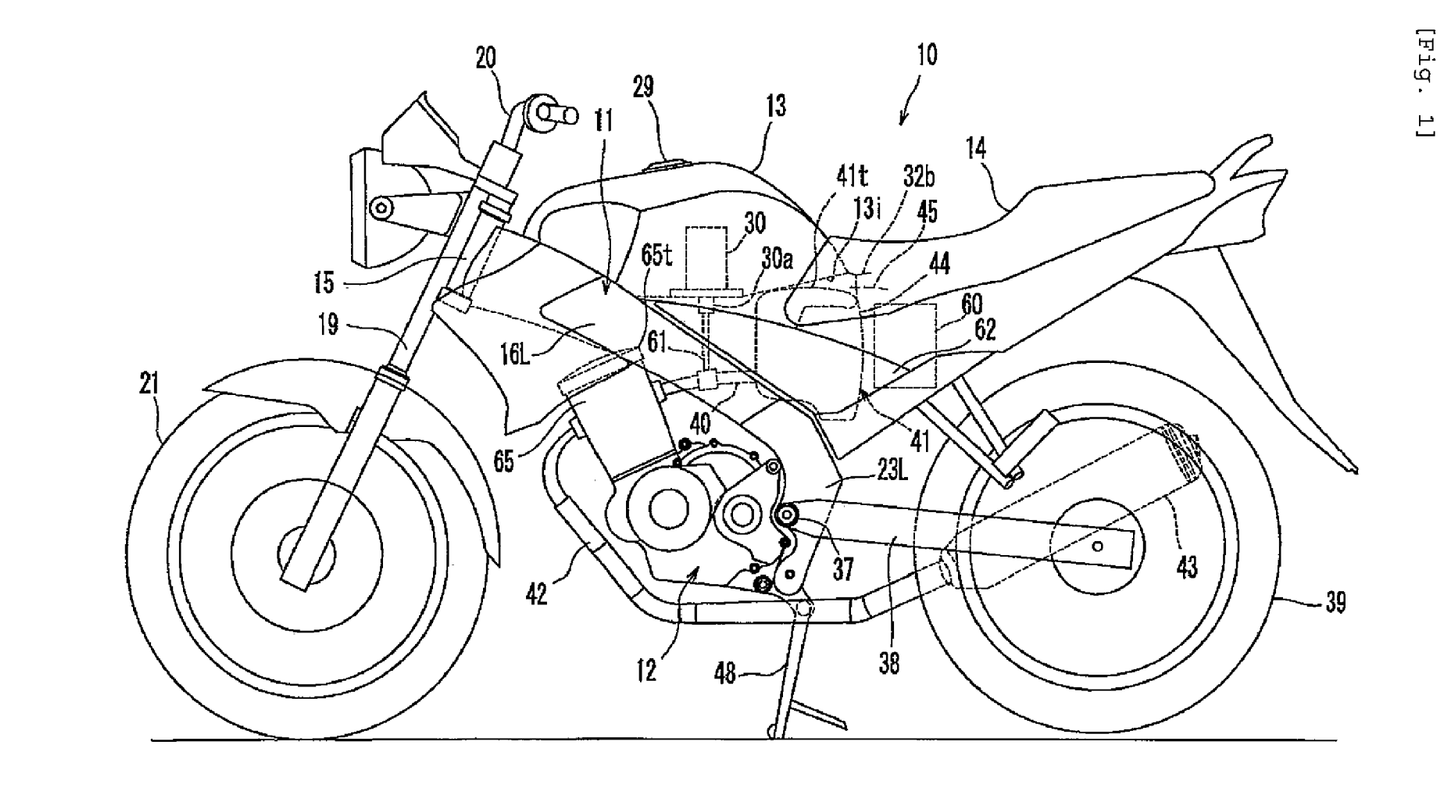
FIG. 1 is a side view of a motorcycle according to the invention.

As shown in FIG. 1, a straddle-type vehicle according to the embodiment is a motorcycle 10. The motorcycle 10 comprises a body frame 11, a water cooled single-cylinder engine 12 suspended from and supported by the body frame 11, a fuel tank 13 supported by the body frame 11, and a seat 14. The seat 14 is disposed behind the fuel tank 13.

Figure 2:
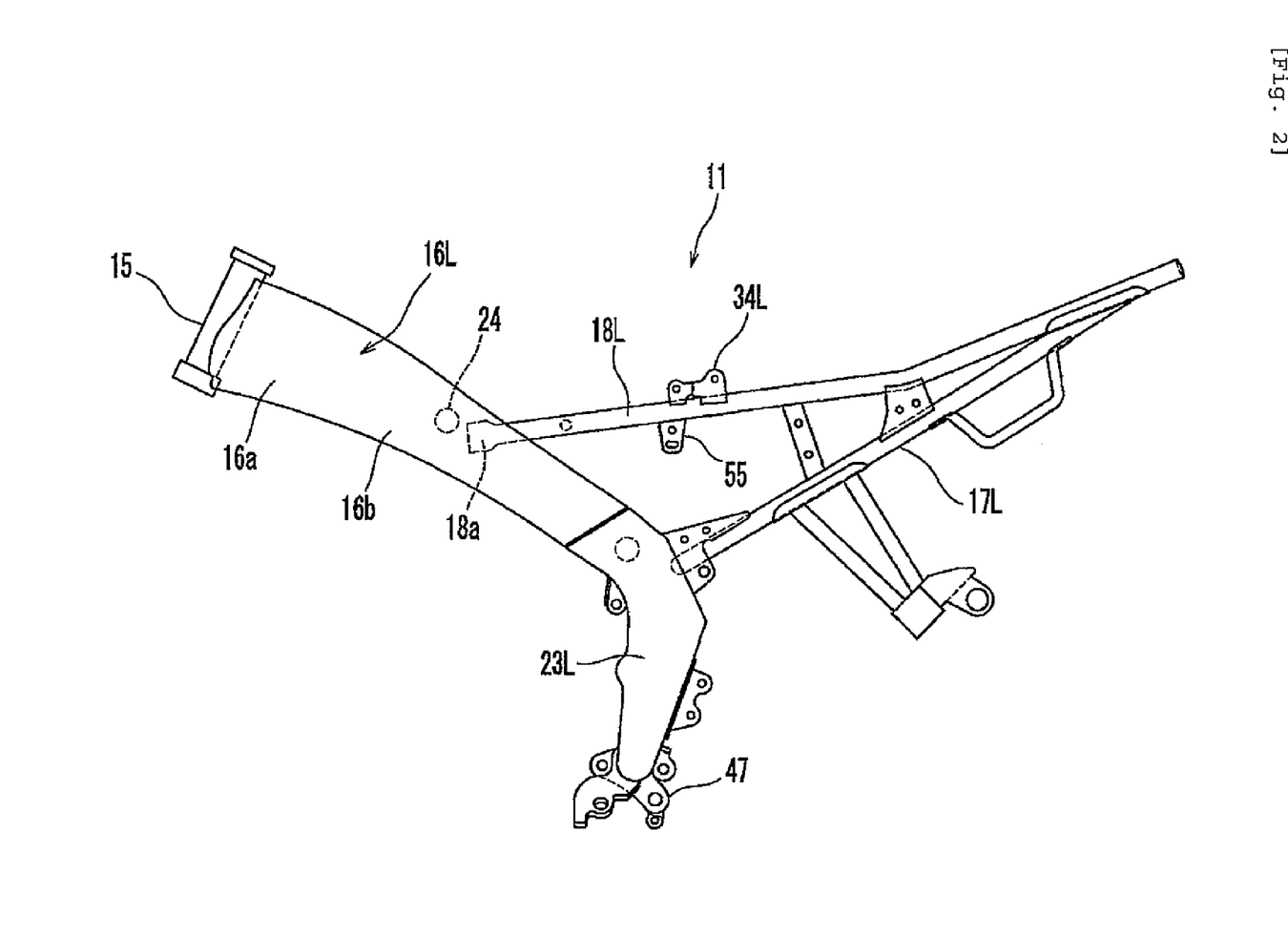
FIG. 2 is a side view of a body frame of the motorcycle of the invention.
Figure 3:
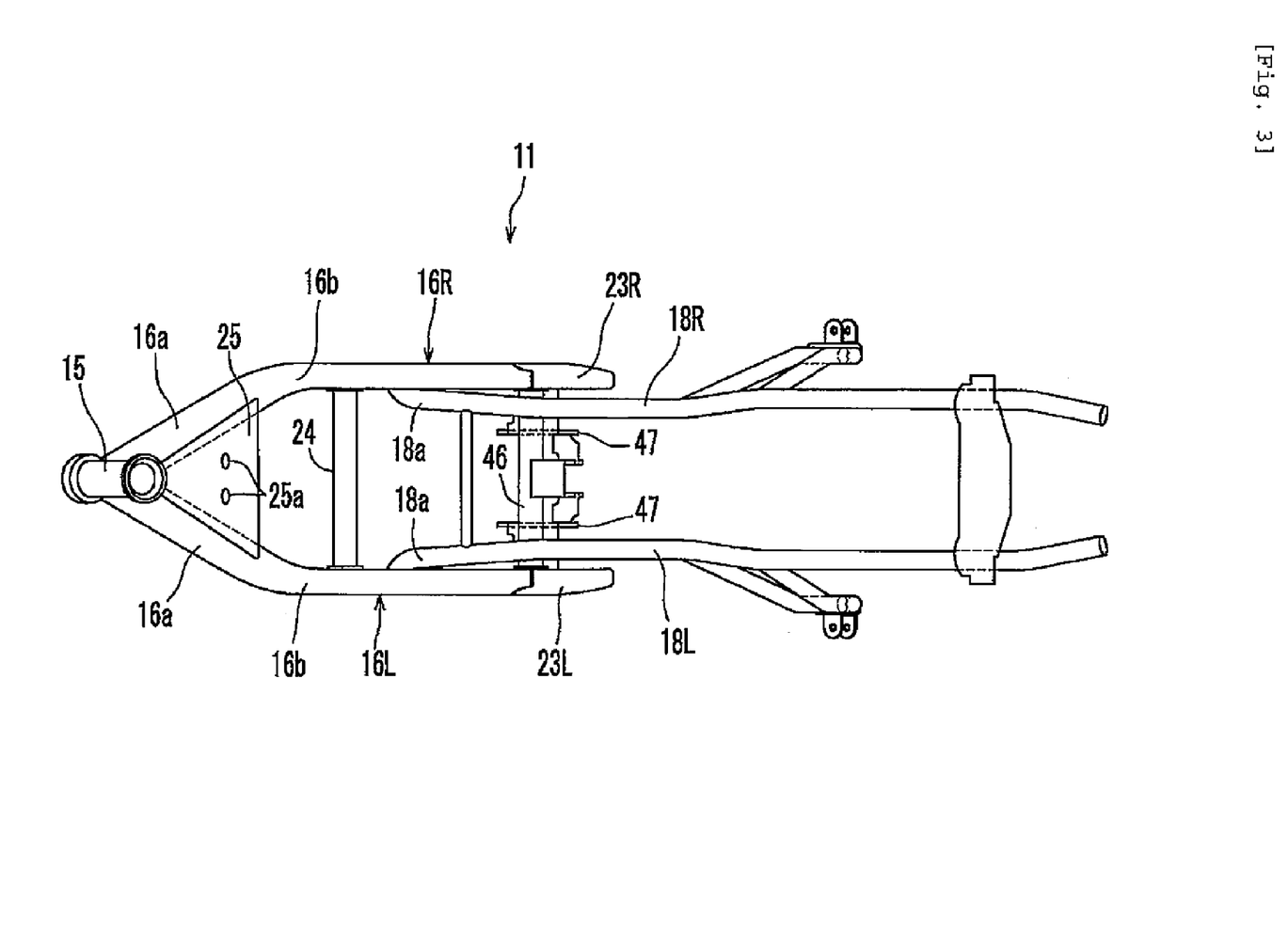
FIG. 3 is a plan view of the body frame.
Figure 4:
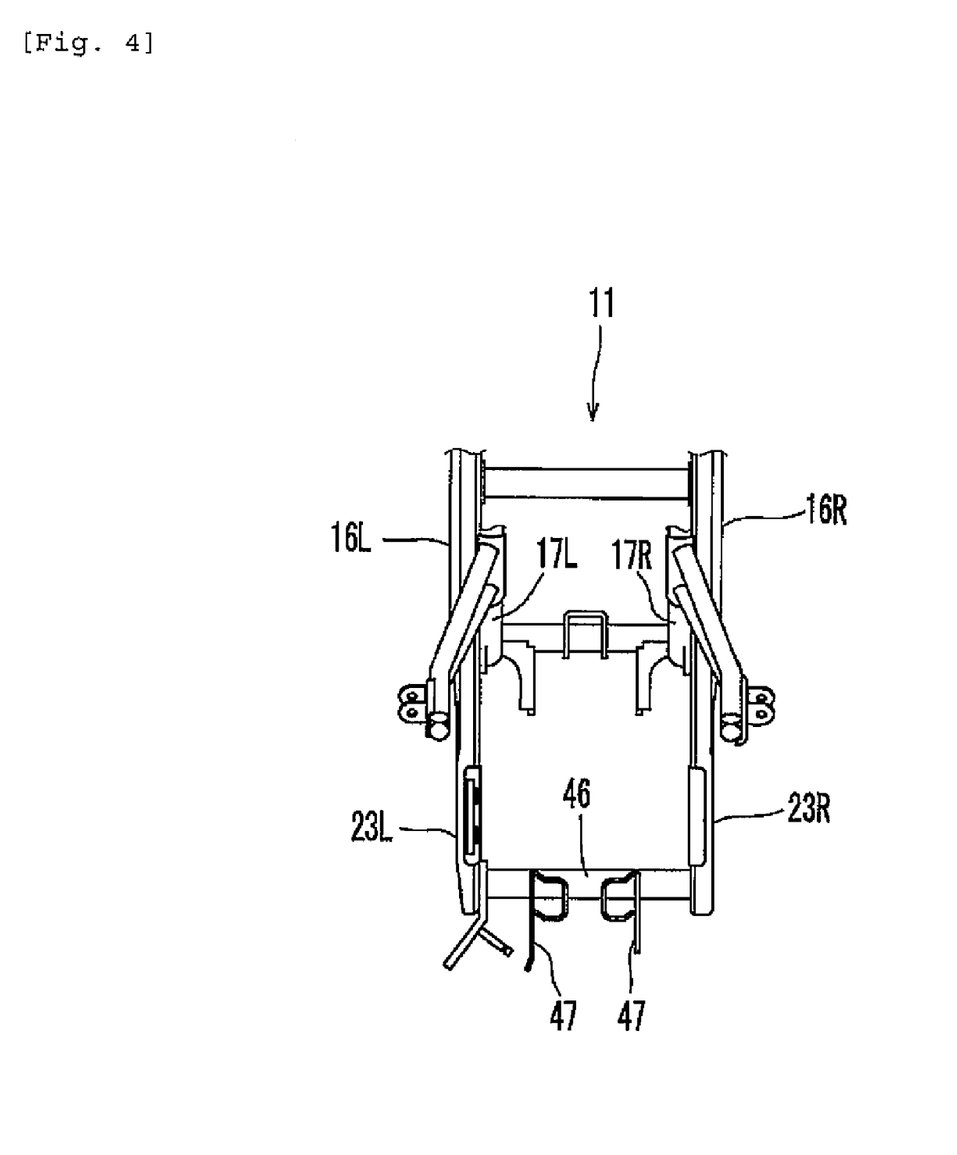
FIG. 4 is a back view of the body frame.

As shown in FIGS. 2-4, the body frame 11 comprises a steering head pipe 15, a pair of left and right main frames 16L, 16R extending from the steering head pipe 15 toward the lower rear, rear arm brackets 23L, 23R joined to rear portions of the main frames 16L, 16R, a pair of left and right backstays 17L, 17R extending from the rear arm brackets 23L, 23R to the upper rear, and a pair of left and right seat rails 18L, 18R extending from intermediate portions of the main frames 16L, 16R toward the upper rear. Rear ends of the back stays 17L, 17R are connected to rear portions of the seat rails 18L, 18R.

As shown in FIG. 1, a front fork 19 is rotatably supported on the steering head pipe 15. The front fork 19 has a steering handle 20 at its upper end and a front wheel 21 supported rotatably its lower end, As shown in FIGS. 2 and 3, the main frames 16L, 16R have a vertical thickness larger than their lateral thickness (in the vehicle width direction), and are formed in the shape of a flat rectangular pipe having a vertically long cross section. As shown in FIG. 3, the main frames 16L, 16R are separate from the front parts 16a to the central parts 16b, and are substantially in parallel from the central parts 16b to the rear. As shown in FIG. 2, the vertical thicknesses of the front parts 16a of the main frames 16L, 16R are almost equal to the vertical length of the steering head pipe 15. The vertical thicknesses of the main frames 16L, 16R decrease from the front parts 16a to the central parts 16b.

As shown in FIG. 3, a cross member 24 extending laterally (in the vehicle width direction) bridges the central part 16b of the left main frame 16L and the central part 16b of the right main frame 16R. Front ends 18a of the seat rails 18L, 18R are connected to the main frames 16R and 16L at the vicinity of the joint portion of the main frames 16L, 16R and the cross member 24 (see FIG. 2).

Figure 5:
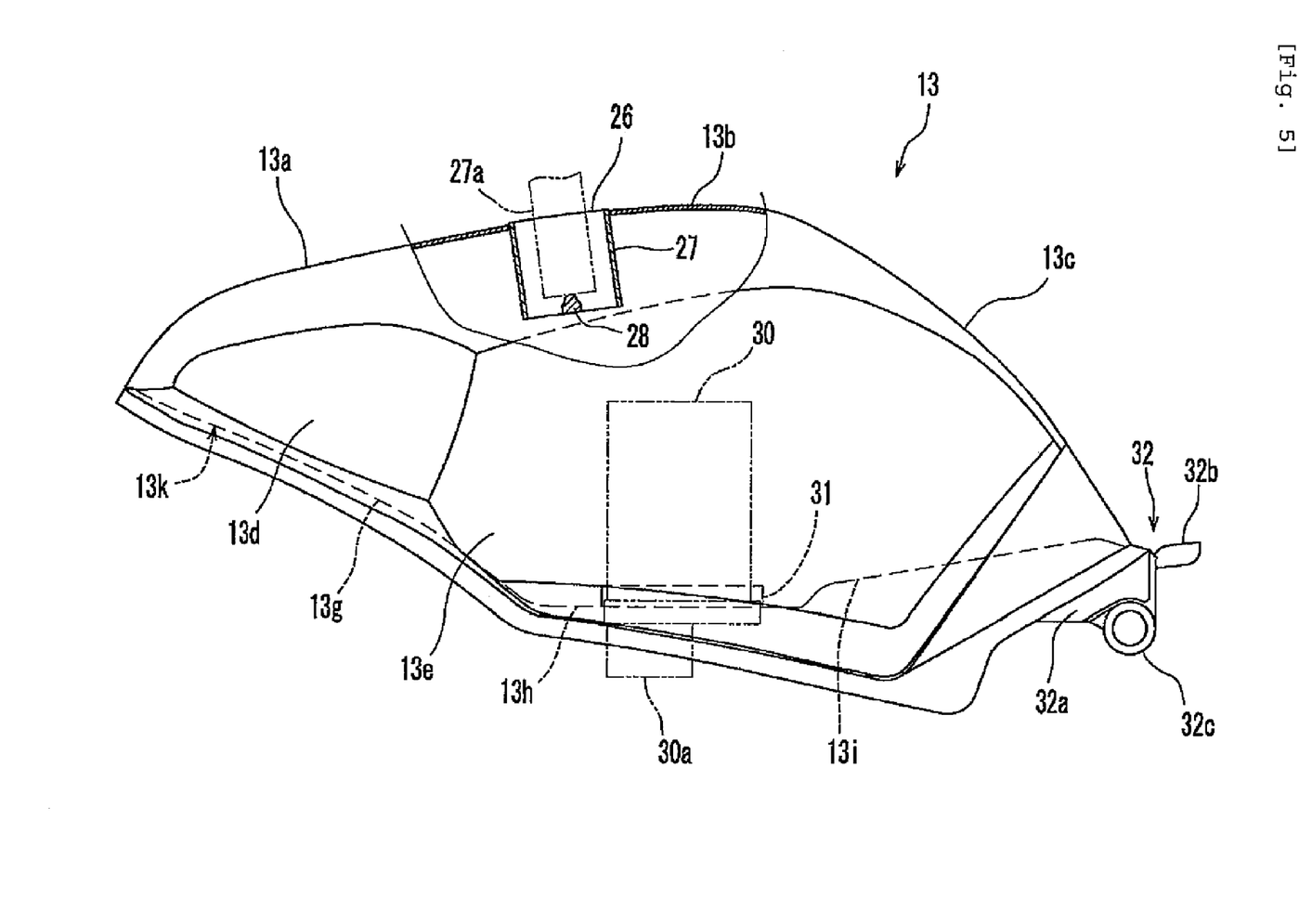
FIG. 5 is a left side view of a fuel tank of the motorcycle of the invention.

As shown in FIG. 5, the fuel tank 13 comprises a front upper surface 13a that inclines to the lower front and a rear upper surface 13c that inclines to the lower rear. The boundary between the front upper surface 13a and the rear upper surface 13c is an upper end 13b located at the uppermost surface of the fuel tank 13. The fuel tank 13 has, on both sides, front sides 13d that protrude laterally as they extend to the rear, and rear sides 13e that protrude laterally as they extend to the front. The rear sides 13e face the rider's knees during riding. Therefore, the rider opens the knees appropriately to assume a comfortable posture along the fuel tank 13.

Figure 7:
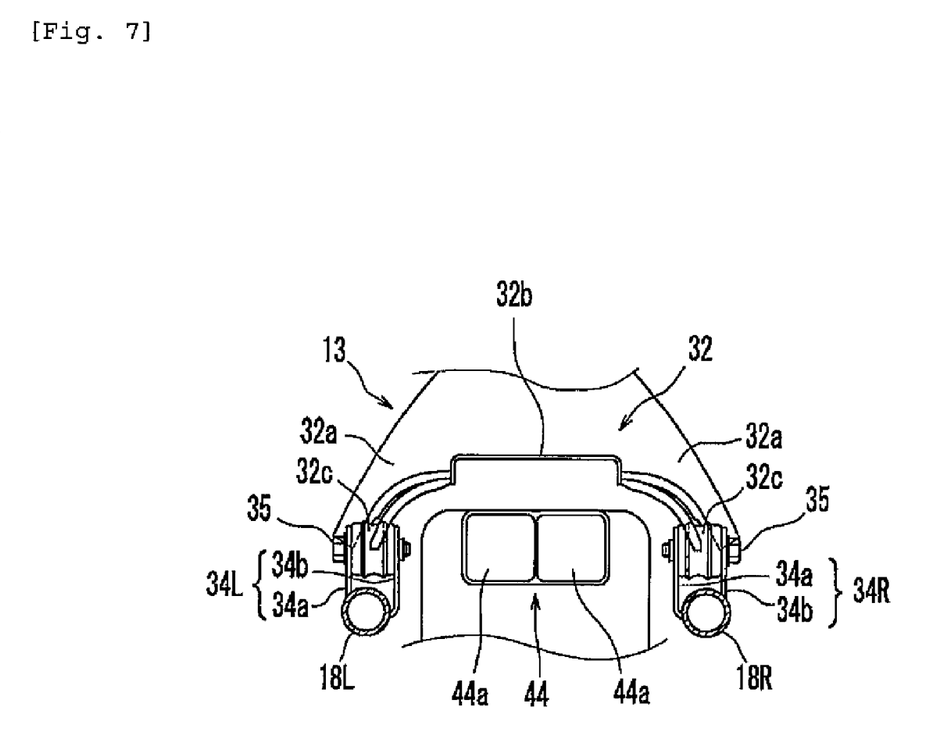
FIG. 7 is a rear view of the fuel tank and an air cleaner of the motorcycle of the invention.

As shown in FIG. 7, the rear of the fuel tank 13 has a recess 32 that projects upward as viewed from the rear. Specifically, the recess 32 comprises curved pieces 32a extending downward from the center toward the left and right sides as viewed from the rear, and a projecting piece 32b positioned between the curved pieces 32a and projecting rearward (see FIG. 5). Ring-shaped brackets 32c are provided at lower ends of the curved pieces 32a.

While the projecting piece 32b and the curved pieces 32a may be connected smoothly together, in this embodiment, the projecting piece 32b projects above the curved pieces 32a so that a step is provided between the projecting piece 32b and the curved pieces 32a. Thus, the projecting piece 32b is located in a higher position than the curved pieces 32a to form a large space below the projecting piece 32b.

Figure 6:
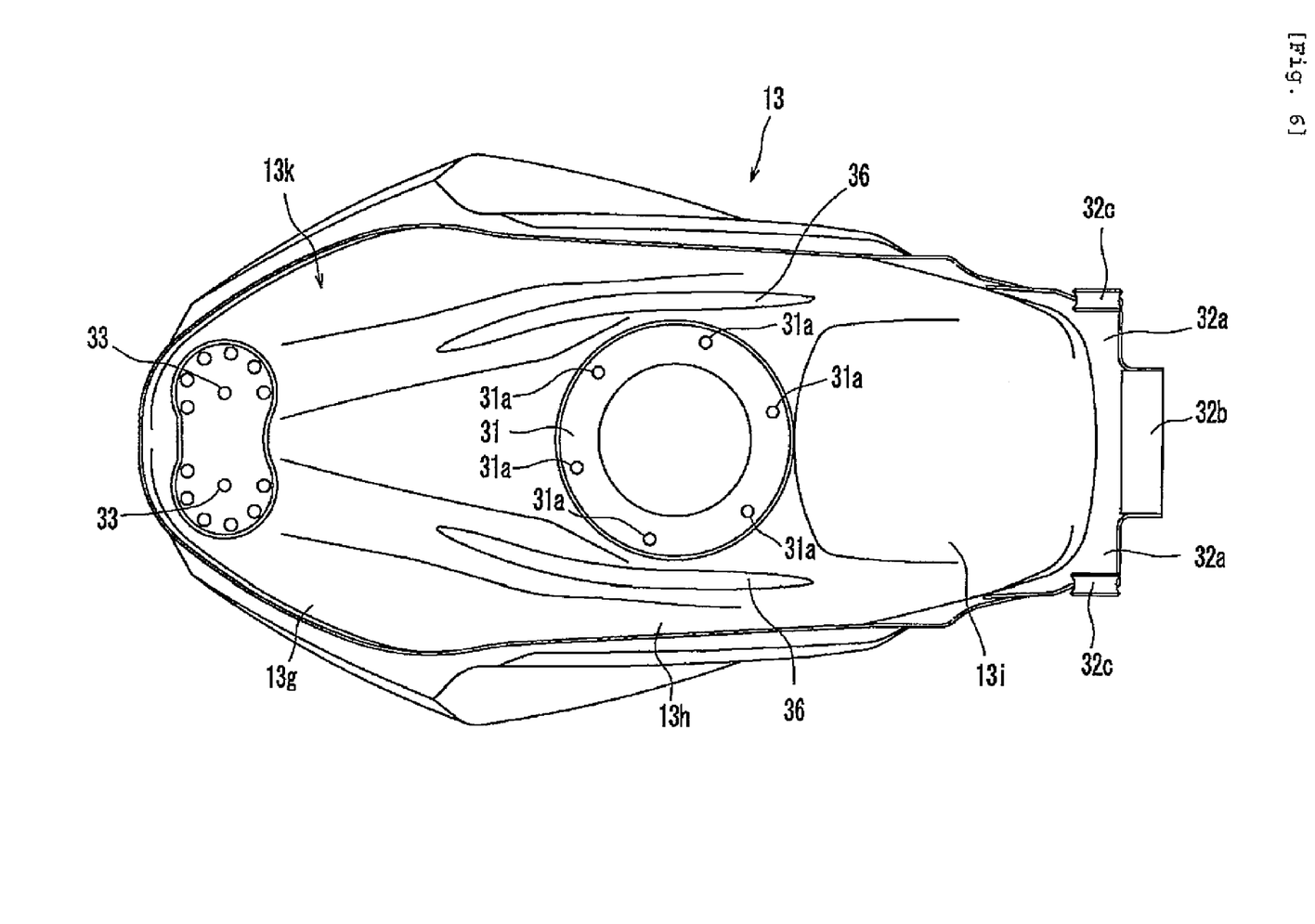
FIG. 6 is a bottom view of the fuel tank.

The mounting structure of the fuel tank 13 is now described. As shown in FIG. 3, a bracket 25 that is substantially triangular, as viewed in plan view, is joined to the top of the front parts 16a of the main frames 16L, 16R. Mount holes 25a are formed on the bracket 25. On the other hand, as shown in FIG. 6, mount holes 33 are formed on a bottom plate 13k of the fuel tank 13 to correspond to the mount holes 25a of the bracket 25. A front portion of the fuel tank 13 is fixed to the main frames 16L, 16R through the bracket 25 by clamping fasteners (not shown) such as bolts into the mount holes 25a and the mount holes 33.

Figure 8:
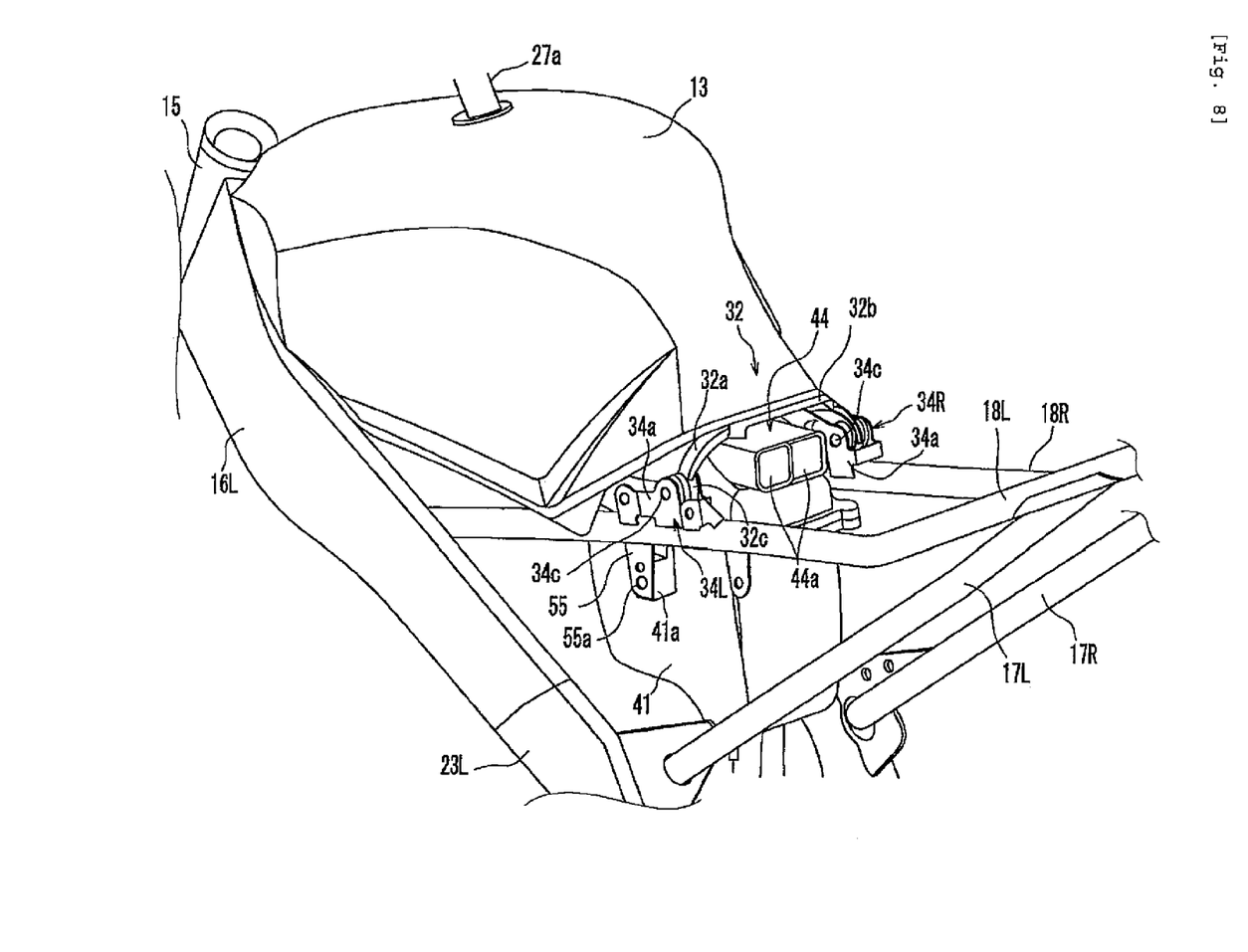
FIG. 8 is a perspective view of the fuel tank and the air cleaner as viewed from the upper left rear.

As shown in FIG. 8, brackets 34L, 34R extending upward are joined to intermediate portions of the seat rails 18L, 18R. As shown in FIG. 7, the brackets 34L, 34R comprise a pair of projections 34a, 34b arranged laterally side-by-side at a specified interval. The projections 34a, 34b project above the seat rails 18L, 18R and may be formed in one piece or separately. Mount holes 34c (see FIG. 8) are formed on the projections 34a, 34b to permit fasteners such as bolts to pass through. As shown in FIG. 7, the left and right brackets 32c of the fuel tank 13 are placed between the projections 34a, 34b of the brackets 34L, 34R of the seat rails 18L, 18R. Fasteners 35, such as bolts, passing through the mount holes 34c of the projections 34a, 34b and the brackets 32c mount the rear portion of the fuel tank 13 to the brackets 34L, 34R.

The fuel tank 13 is rotatably mounted to the brackets 34L, 34R. Therefore, in a state in which the front portion of the fuel tank 13 is not fixed to the main frames 16L, 16R, the fuel tank 13 can be rotated with the brackets 32c as a fulcrum. This facilitates work on vehicle components disposed under the fuel tank 13 by rotating the fuel tank 13 rearward into an upright state relative to the seat rails 18L, 18R.

As shown in FIG. 5, a fuel pump 30 is arranged in the fuel tank 13. The fuel pump 30 is located at about the center of the fuel tank 13 in a longitudinal direction (lateral direction in FIG. 5). An oil filler hole 26 is formed in the front upper surface 13a of the fuel tank 13. A cylinder 27 having substantially the same diameter as that of the oil filler hole 26 is provided inside the oil filler hole 26. A stopper 28 extending in a left and right direction bridges a lower end of the cylinder 27 so as to prevent a fuel oil gun 27a from contacting the fuel pump 30 at the time of fueling. Thus, when the fuel oil gun 27a is inserted into the oil filler hole 26, a tip end of the fuel oil gun 27a contacts the stopper 28 to prevent excessive insertion of the fuel oil gun 27a. The oil filler hole 26 is closed by a lid 29 (see FIG. 1) except at the time of fueling.

Figure 9:
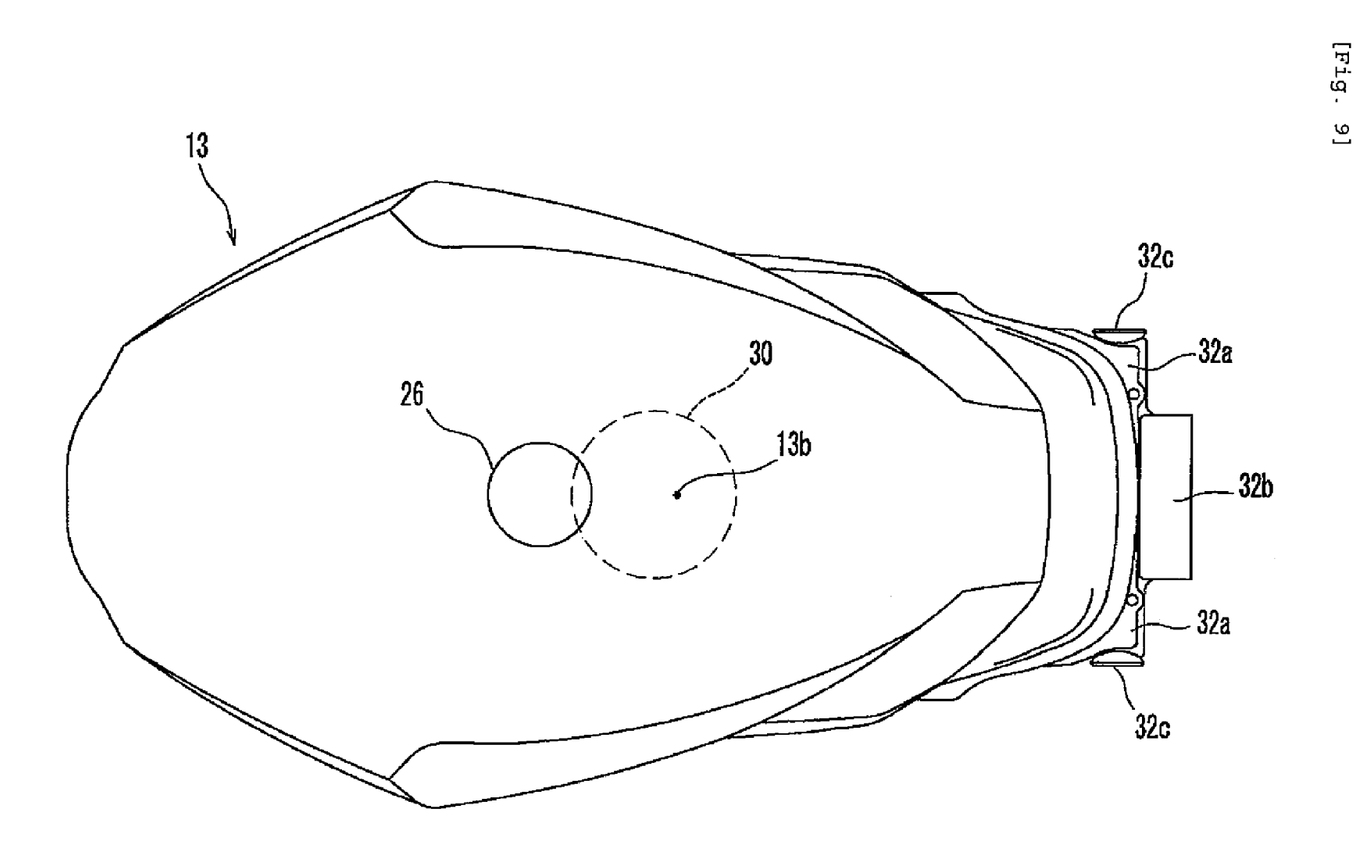
FIG. 9 is a plan view of a fuel tank according to the invention.

As shown in FIG. 9, the upper end 13b of the fuel tank 13 and the fuel pump 30 overlap as viewed in plan view. That is, the fuel pump 30 is arranged in the vicinity of the upper end 13b of the fuel tank 13, and in that portion of the fuel tank 13 having the most upward space (also, see FIG. 5).

As shown in FIG. 5, the bottom plate 13k of the fuel tank 13 comprises a front bottom surface 13g inclined toward the upper front, a substantially horizontal, central bottom surface 13h, and a rear bottom surface 13i inclined toward the lower front. The mount holes 33 (see FIG. 6) described above are formed in the front bottom surface 13g. The central bottom surface 13h is positioned in a lower location than the front bottom surface 13g and the rear bottom surface 13i.

As shown in FIG. 6, the central bottom surface 13h has a mount seat 31 for mounting the fuel pump 30. The mount seat 31 is shaped like a ring. A plurality (six in the embodiment) of mount holes 31a are spaced circumferentially at predetermined intervals around the mount seat 31. As shown in FIG. 5, the fuel pump 30 is inserted into the fuel tank 13 from a central opening of the mount seat 31 and then mounted to the mount seat 31 by clamping fasteners, such as bolts, to the mount holes 31a. Accordingly, the fuel pump 30 is mounted in a low location in the fuel tank 13.

Figure 10:
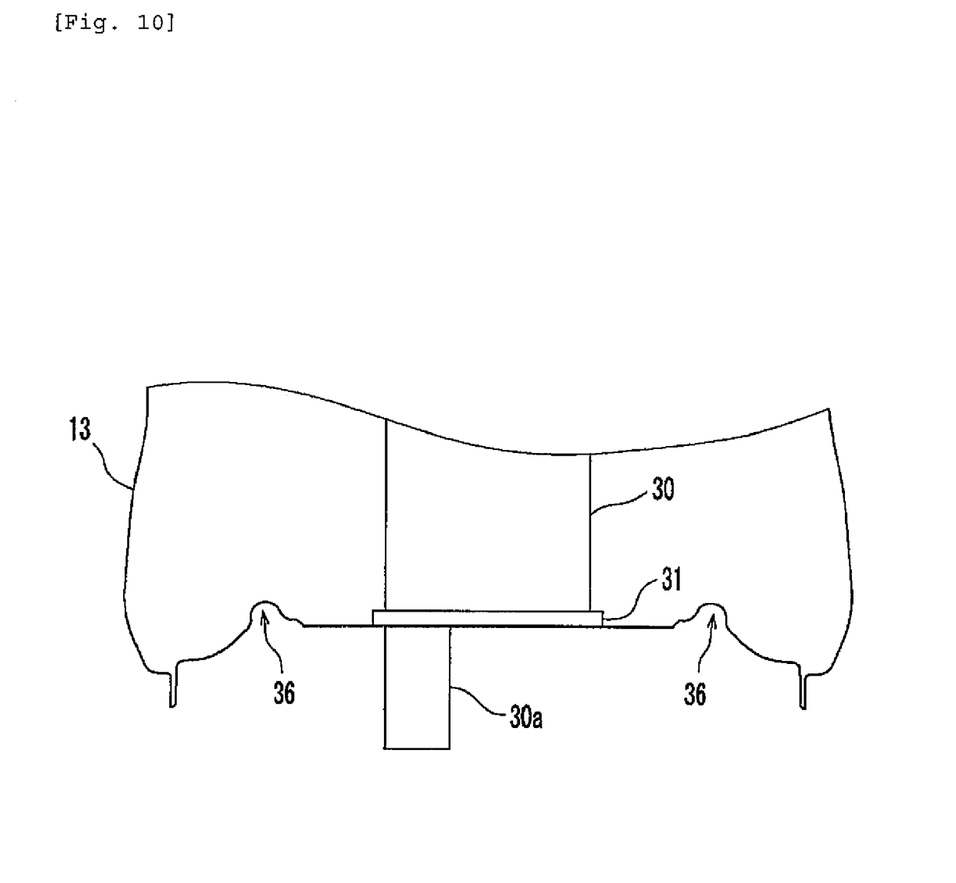
FIG. 10 is a conceptual cross sectional view showing the irregular shape of the bottom surface of the fuel tank.

As shown in FIG. 6, grooves (beads) 36 projecting upward are formed on left and right sides of the mount seat 31 on the bottom plate 13k of the fuel tank 13 (also, see FIG. 10). The grooves 36 extend in a lengthwise direction (longitudinal direction) of the fuel tank 13.

As shown in FIG. 1, a pivot shaft 37 provided on the rear arm brackets 23L, 23R pivotally supports a front end of a rear arm 38. A rear wheel which is a driving wheel is rotatably supported on a rear end of the rear arm 38.

The engine 12 is supported by the main frames 16L, 16R and the rear arm brackets 23L, 23R. The engine 12 comprises a cylinder 65 extending toward the upper front. The cylinder 65 as depicted comprises the whole body including a cylinder body and a cylinder head. The cylinder 65 may not necessarily extend obliquely upward but may extend upward. The cylinder 65 is connected to an air cleaner 41 via an intake pipe 40 and to a muffler 43 via an exhaust pipe 42.

One end of the intake pipe 40 is connected to the cylinder 65 and the other end of the intake pipe 40 is connected to the air cleaner 41. The intake pipe 40 is arranged in a lower position than both an upper end 65t of the cylinder 65 and an upper end 41t of the air cleaner 41.

A joint portion 30a connected to a fuel supply pipe 61 is formed at a lower end of the fuel pump 30. Fuel discharged from the fuel pump 30 is conveyed to the fuel supply pipe 61 via the joint portion 30a and supplied to the intake pipe 40 through the fuel supply pipe 61. As shown in FIG. 1, the joint portion 30a is arranged in a higher position than the main frames 16R, 16L as viewed from the side (higher than the main frames 16L, 16R with reference to the same longitudinal position).

A side cover 62 is mounted to a side of the vehicle body frame 11 and covers at least a part of a side of the joint portion 30a. Therefore, the joint portion 30a cannot be viewed from the exterior.

The air cleaner 41 has a longwise approximately rectangular parallelepiped shape. The vertical length of the air cleaner 41 is greater than both its longitudinal and lateral lengths. Here, the vertical, longitudinal and lateral lengths mean maximum vertical, longitudinal and lateral lengths. The intake pipe 40 is connected to the bottom of the front surface of the air cleaner 41 and an intake portion 44 is formed at the upper rear side of the air cleaner 41 (see FIG. 8) to permit air to be drawn from the rear. The intake portion 44 has intake ports 44aI that are opened rearward to draw in air from the rear.

The air cleaner 41 is disposed below the rear portion of the fuel tank 13. Specifically, as shown in FIG. 1, the air cleaner 41 is disposed below the rear bottom surface 13i of the fuel tank 13. In this embodiment, the rear portion of the fuel tank 13 is supported by the brackets 34L, 34R on the seat rails 18L, 18R and no cross member is present between the left and right seat rails 18L, 18R to support the rear portion of the fuel tank 13. Therefore, the air cleaner 41 can be positioned higher than is conventionally possible, or increased in length in the vertical and horizontal directions (see FIG. 8). The upper end 41t (see FIG. 1) of the air cleaner 41 projects above the seat rails 18L, 18R. The upper end 41t of the air cleaner 41 is positioned above upper ends of the brackets 34L, 34R. Consequently, the fuel tank 13 and the air cleaner 41 overlap each other as viewed in side view.

As shown in FIG. 8, downwardly extending brackets 55 are joined to the seat rails 18L, 18R. Outwardly extending mounts 41a are formed on both left and right sides of the air cleaner 41. The brackets 55 and the mounts 41a are formed with mount holes 55a, through which fasteners, such as bolts, etc., are inserted, and the air cleaner 41 is fixed to the brackets 55 by means of the fasteners. In this embodiment, the air cleaner 41 is supported only by the seat rails 18L, 18R through the brackets 55.

As shown in FIG. 7, the intake portion 44 of the air cleaner 41 is arranged below the recess 32 on the rear of the fuel tank 13 and especially positioned just below the projecting piece 32b of the fuel tank 13 as viewed from the rear. The projecting piece 32b extends rearwardly of the intake portion 44 to cover a region above the intake portion 44.

As shown in FIG. 1, the seat 14 is supported by the seat rails 18L, 18R (see FIGS. 2 and 3) through brackets (not shown). The seat 14 has a saddle-like shape and has a forwardly projecting piece 45 on its backside that covers a region above the intake portion 44 of the air cleaner 41 and that enters below the projecting piece 32b of the fuel tank 13.

Figure 12:
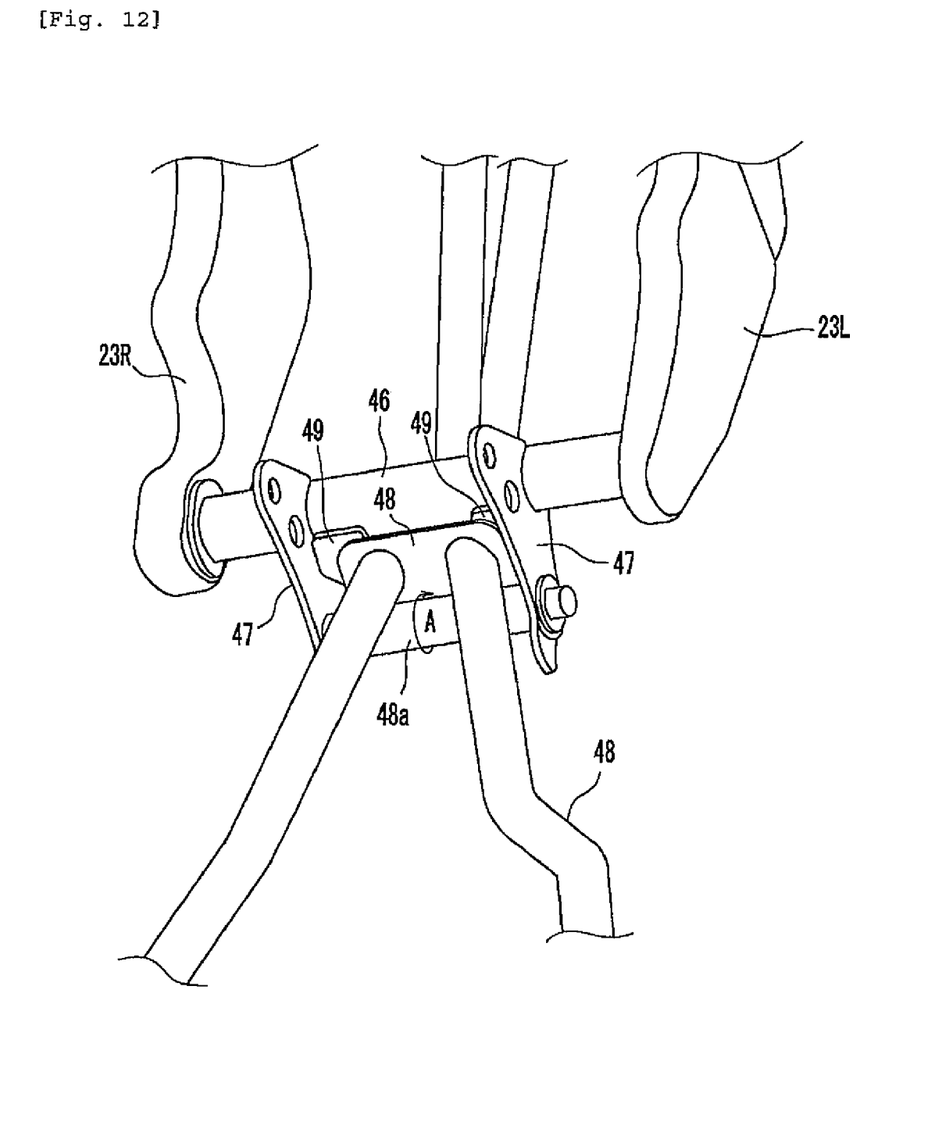
FIG. 12 is a perspective view of the base of a main stand as viewed from the lower left front according to the invention.

As shown in FIG. 12, a laterally extending cross member 46 bridges lower ends of the left and right rear arm brackets 23L, 23R. A pair of left and right brackets 47 are joined to the cross member 46 to suspend the engine 12 therefrom. A turning shaft 48a of a main stand 48 is rotatably supported on the brackets 47. Thus, the brackets 47 serve both as brackets for the engine 12 and as brackets for the main stand 48. In other words, brackets for the engine 12 and brackets for the main stand 48 are in common.

As shown in FIG. 12, link brackets 49 are joined to the brackets 47. The link brackets 49 also function as stoppers for the main stand 48. That is, when the main stand 48 is turned from a housed state toward an upright state (turned in the direction A in the figure), a stopper 48b of the main stand 48 abuts against the link brackets 49, thereby preventing excessive turning of the main stand 48 and holding it in a predetermined position.

Figure 11:
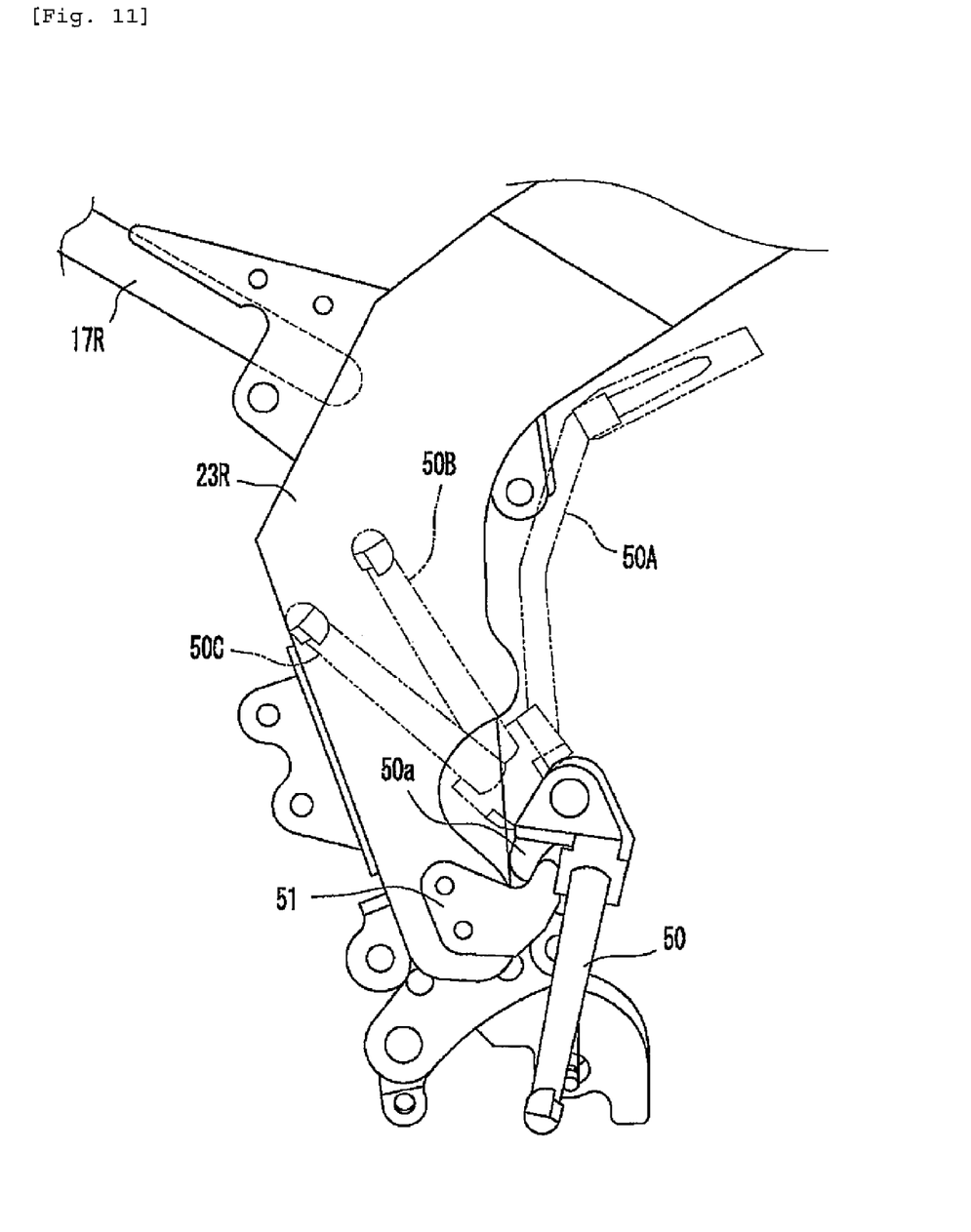
FIG. 11 is a right side view of a rear arm bracket according to the invention.

FIG. 11 is a side view showing the right rear arm bracket 23R. A kick pedal 50 is arranged forwardly of a lower half of the rear arm bracket 23R. A stopper 51 is fixed to a lower end of the rear arm bracket 23R to prevent excessive turning of the kick pedal 50. At the time of kicking, a rider depresses the kick pedal 50 from the housed state (state indicated by the reference numeral 50A) by stepping on the kick pedal 50. Consequently, the kick pedal 50 is turned counterclockwise as viewed from a right side. When the kick pedal 50 turns a predetermined angle or more, the stopper portion 50a of the kick pedal 50 abuts against the stopper 51, so that excessive turning of the kick pedal 50 is inhibited. Reference numeral SOB indicates a state in which the kick pedal 50 is developed from the accommodated state, and the reference numeral 50C indicates a state of the kick pedal 50 during turning.

When the stopper 51 for the kick pedal 50 is provided on a crank case of the engine 12, the stopper 51 is obstructive and limits the position of the pivot shaft 37. In contrast, according to the embodiment, the stopper 51 is mounted not on a side of the engine 12 but on a side (strictly, the rear arm bracket 23R) of the body frame 11. Accordingly, restrictions on the position of the pivot shaft 37 are decreased and freedom in layout is increased.

As described above, the mount seat 31 of the fuel tank 13 is provided on that portion (the central bottom surface 13h) of the bottom plate 13k of the fuel tank 13 that is lower than a portion (the rear bottom surface 13i) positioned above the air cleaner 41. Fuel accumulated on the rear bottom surface 13i naturally flows down toward the central bottom surface 13h. Accordingly, fuel is not retained on the rear bottom surface 13i and ineffective fuel residue is reduced.

Also, according to the embodiment, since it is not necessary to provide any external pipe line below the fuel tank 13, it is possible to simplify construction of the fuel supply system. Also, since the fuel pump 30 is arranged in a position except above the air cleaner 41, interference between the fuel pump 30 and the air cleaner 41 is avoided and increased air cleaner volume can be achieved without obstruction by the fuel pump 30 and its piping (for example, fuel supply pipe 61).

Also, according to the embodiment, the fuel pump 30 is positioned substantially centrally of the fuel tank 13 in the longitudinal direction. Therefore, fluctuation of the fuel liquid level is small in the vicinity of the fuel pump 30 and it is possible to stably supply fuel from the fuel pump 30.

Also, left and right main frames 16L, 16R have a thickness in the vertical direction that is greater than that a thickness in the vehicle width direction, and the joint portion 30a of the fuel pump 30 is at a higher position than the main frames 16L, 16R, as viewed in side view. Accordingly, when connecting pipes or wiring, or the like for the joint portion 30a, the main frames 16L, 16R do not get in the way and working efficiency is increased.

Also, side cover 62 covers at least a part of the side of the joint portion 30a of the fuel pump 30. Therefore, joint portion 30a is protected while still maintaining a favorable outward appearance.

Also, according to the embodiment, the cylinder 65 of the engine 12 extends obliquely upward and the intake pipe 40 is arranged at a lower position than both the upper end 65t of the cylinder 65 and the upper end 41t of the air cleaner 41. Therefore, an empty space is provided above the intake pipe 40. The fuel pump 30 is positioned arranged in this empty space between the cylinder 65 and the air cleaner 41. Thus, the fuel pump 30 is arranged efficiently with little wasted space, and in a relatively low position.

Further, according to the embodiment, the engine 12 is a single cylinder engine. Generally, a motorcycle 10 with a single cylinder engine mounted thereon possesses a running characteristic, which is tenacious at a time of low rotation, and the intake pipe 40 is preferably lengthened in order to further make the best use of the characteristic. Here, when the intake pipe 40 is lengthened, an empty space above the intake pipe 40 is further enlarged to further increase freedom in arranging the fuel pump 30.

As described above, the left and right main frames 16L, 16R have a thickness in the vertical direction that is larger than that in the vehicle width direction. In this configuration heat is liable to work below the front portion of the fuel tank 13, but the fuel pump 30 is not present below the front portion of the fuel tank 13. Therefore, a passage for introduction of a travel wind is defined below the front portion of the fuel tank 13 and a travel wind flowing through the passage provides cooling below the front portion of the fuel tank 13. Accordingly, although the main frames 16L, 16R having a large thickness in the vertical direction are provided, heat is inhibited from working between the main frames 16L, 16R.

Also, according to the embodiment, a top of the fuel pump 30 overlaps the upper end 13b of the fuel tank 13 as viewed in plan view. That is, the fuel pump 30 is positioned in the vicinity of that portion of the upper surface of the fuel tank 13, which is positioned in a highest location. Therefore, a margin is produced in a space, in which the fuel pump 30 is mounted, so that it is possible to use even a relatively large-sized pump. Accordingly, greater freedom in fuel pump selection is provided.

According to the embodiment, the oil filler hole 26 of the fuel tank 13 is positioned forwardly of the fuel pump 30 with respect to a longitudinal position. Accordingly, there is less chance that the fuel oil gun 27a inserted into the oil filler hole 26 will damage the fuel pump 30 at the time of fueling.

The stopper 28 is provided on the fuel tank 13 to prevent insertion of the fuel oil gun 27a beyond a predetermined extent. Accordingly, contact between the fuel oil gun 27a and the fuel pump 30 is prevented.

Also, according to the embodiment, the grooves (beads) 36 projecting upward are formed outwardly of the mount seat 31 on the bottom plate 13k of the fuel tank 13. Therefore, when a residual quantity of a fuel is decreased, fuel once getting over the beads 36 due to left and right movements of a vehicle or the like is held around the mount seat 31, so that fuel is stably supplied from the fuel pump 30. When the fuel tank 13 is molded, the grooves 36 absorb excess material thickness for the tank. That is, when a wall is left over at the time of press working or the like, there is a fear of generation of wrinkles and crazing, but it is possible according to the embodiment that the grooves 36 can absorb a wall left over.

Accordingly, generation of wrinkles, crazing, or the like in the fuel tank 13 at the time of molding are prevented to improve manufacture of the fuel tank 13 in yield.

A straddle-type vehicle according to the invention is not limited to motorcycles but may be another straddle-type vehicle such as a four-wheeled buggy or the like.

As described above, the invention is useful for straddle-type vehicles such as motorcycles, etc.

The particular embodiments of the invention described in this document should be considered illustrative, rather than restrictive. Modification to the described embodiments may be made without departing from the spirit of the invention as defined by the following claims.

The invention claimed is:

1. A straddle-type vehicle comprising:
a fuel tank including a bottom plate formed with a mount seat;
a seat arranged rearwardly of the fuel tank;
an air cleaner arranged below a rear portion of the fuel tank; and
a fuel pump mounted to the mount seat and having at least a part thereof accommodated in the fuel tank, wherein
the mount seat is provided on a portion of the bottom plate of the fuel tank that is lower than a portion of the bottom plate positioned above the air cleaner, and
the air cleaner has an intake port positioned below a rear portion of the fuel tank for introducing ambient air into the air cleaner.

2. The straddle-type vehicle according to claim 1, wherein the fuel pump is positioned centrally in the fuel tank in a longitudinal direction.

3. The straddle-type vehicle according to claim 1, further comprising
a pair of left and right frame members having a thickness in a vertical direction that is greater than a thickness in a lateral direction; and
a fuel supply passage through which fuel discharged from the fuel pump is led, wherein
a joint portion is formed on a lower portion of the fuel pump to be connected to the fuel supply passage, and
the joint portion is a higher than the frame members as viewed in side view.

4. The straddle-type vehicle according to claim 3, further comprising a side cover that covers at least a part of a side of the joint portion.

5. The straddle-type vehicle according to claim 2, further comprising:
an engine arranged forwardly of the air cleaner and having a cylinder extending upward; and
an intake passage connected to the cylinder and the air cleaner and positioned lower than an upper end of the cylinder and an upper end of the air cleaner,
wherein the fuel pump is positioned between the cylinder and the air cleaner in a longitudinal direction.

6. The straddle-type vehicle according to claim 5, wherein the engine is a single cylinder engine.

7. The straddle-type vehicle according to claim 2, further comprising a pair of left and right frame members having a thickness in a vertical direction that is greater than a thickness in a lateral direction.

8. The straddle-type vehicle according to claim 1, wherein a top of the fuel tank and a top of the fuel pump overlap as viewed in plan view.

9. The straddle-type vehicle according to claim 1, wherein the fuel tank is formed with an oil filler hole that is positioned forwardly of the fuel pump.

10. The straddle-type vehicle according to claim 1, wherein:
the fuel tank is formed with an oil filler hole, and
the fuel tank comprises a stopper that inhibits insertion of a fuel oil gun beyond a predetermined extent into the oil filler hole.

11. The straddle type vehicle according to claim 1, wherein a recess projecting upward is formed on the bottom plate of the fuel tank to be outside the mount seat in a lateral direction.

* * * * *

UNITED STATES PATENT AND TRADEMARK OFFICE
CERTIFICATE OF CORRECTION

PATENT NO. : 7,614,468 B2
APPLICATION NO. : 11/557936
DATED : November 10, 2009
INVENTOR(S) : Satake et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 397 days.

Signed and Sealed this

Nineteenth Day of October, 2010

David J. Kappos
*Director of the United States Patent and Trademark Office*